United States Patent
Yoshizawa et al.

(10) Patent No.: US 12,444,075 B2
(45) Date of Patent: Oct. 14, 2025

(54) IMAGE PROCESSING APPARATUS AND IMAGE PROCESSING METHOD

(71) Applicant: MAXELL, LTD., Kyoto (JP)

(72) Inventors: Kazuhiko Yoshizawa, Kyoto (JP); Satoru Takashimizu, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/621,256

(22) Filed: Mar. 29, 2024

(65) Prior Publication Data

US 2024/0242376 A1    Jul. 18, 2024

Related U.S. Application Data

(63) Continuation of application No. 17/611,200, filed as application No. PCT/JP2019/019544 on May 16, 2019, now Pat. No. 11,972,591.

(51) Int. Cl.
*G06T 7/70* (2017.01)
*G06T 11/60* (2006.01)

(52) U.S. Cl.
CPC .............. *G06T 7/70* (2017.01); *G06T 11/60* (2013.01)

(58) Field of Classification Search
CPC .... H04N 1/3872; H04N 1/3871; H04N 1/387; G06T 11/60
See application file for complete search history.

(56) References Cited

U.S. PATENT DOCUMENTS

| 7,133,083 B2 | 11/2006 | Jaynes et al. |
| 7,212,653 B2 | 5/2007 | Sato et al. |

(Continued)

FOREIGN PATENT DOCUMENTS

| JP | 2004-088273 A | 3/2004 |
| JP | 2014-212473 A | 11/2014 |
| WO | 2004/105383 A1 | 12/2004 |

OTHER PUBLICATIONS

International Search Report of PCT/JP2019/019544 dated Aug. 6, 2019.

(Continued)

*Primary Examiner* — Bobbak Safaipour
(74) *Attorney, Agent, or Firm* — Mattingly & Malur, PC

(57) ABSTRACT

In an image processing apparatus 100, an image acquiring portion 11 acquires image information. A position acquiring portion 12 acquires an image capturing position and an image capturing direction of the image information. An image-capturing propriety information acquiring portion 13 acquires image-capturing propriety information indicating that a position of an information terminal 200 corresponds to image-capturing propriety setting information. An image editing portion 14 performs a masking process to a range based on the information terminal 200 in the image information acquired by the image acquiring portion 11, in accordance with image-capturing propriety setting information of the image-capturing propriety information indicating that the position of the information terminal 200 in the image-capturing propriety information corresponds to the image capturing range based on the image capturing position and the image capturing direction acquired by the position acquiring portion 12.

6 Claims, 15 Drawing Sheets

(56) References Cited

U.S. PATENT DOCUMENTS

| | | | |
|---|---|---|---|
| 7,356,165 B2 * | 4/2008 | Takarada | H04N 23/6811 382/103 |
| 7,365,848 B2 * | 4/2008 | Raval | G03F 9/7003 430/22 |
| 7,489,335 B2 | 2/2009 | Kochi et al. | |
| 7,570,283 B2 | 8/2009 | Sato et al. | |
| 7,570,985 B2 * | 8/2009 | Takabayashi | A61B 5/0275 324/309 |
| 7,620,206 B2 * | 11/2009 | Ohba | H04N 7/142 348/169 |
| 7,623,250 B2 | 11/2009 | Moctezuma de la Barrera et al. | |
| 7,634,308 B2 * | 12/2009 | Ogawa | A61B 6/504 378/98.12 |
| 7,864,198 B2 * | 1/2011 | Moroto | H04N 1/3872 345/626 |
| 7,893,959 B2 | 2/2011 | Miyata | |
| 8,044,996 B2 | 10/2011 | Rice et al. | |
| 8,179,442 B2 | 5/2012 | Ikeda | |
| 11,616,907 B2 * | 3/2023 | Hata | H04N 23/60 348/207.99 |
| 11,972,591 B2 * | 4/2024 | Yoshizawa | H04N 7/18 |
| 2014/0334676 A1 * | 11/2014 | Skans | G06T 7/292 382/103 |
| 2015/0020014 A1 * | 1/2015 | Suzuki | G06F 3/011 715/846 |
| 2022/0262029 A1 * | 8/2022 | Yoshizawa | H04N 7/18 |
| 2024/0242376 A1 * | 7/2024 | Yoshizawa | H04N 7/18 |
| 2025/0166219 A1 * | 5/2025 | Yoshizawa | G06T 11/60 |
| 2025/0173930 A1 * | 5/2025 | Ueda | G06T 11/60 |

OTHER PUBLICATIONS

Japanese Office Action received in corresponding Japanese Application No. 2023-097762 dated Feb. 12, 2025.

* cited by examiner

FIG. 2
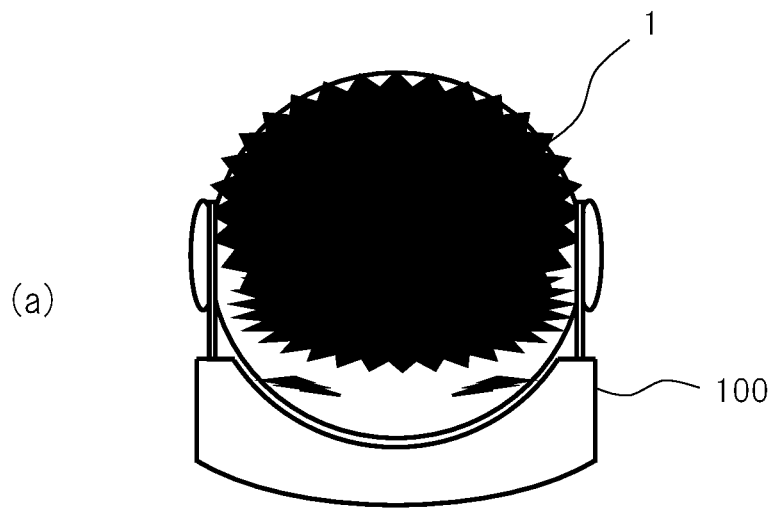
(a)
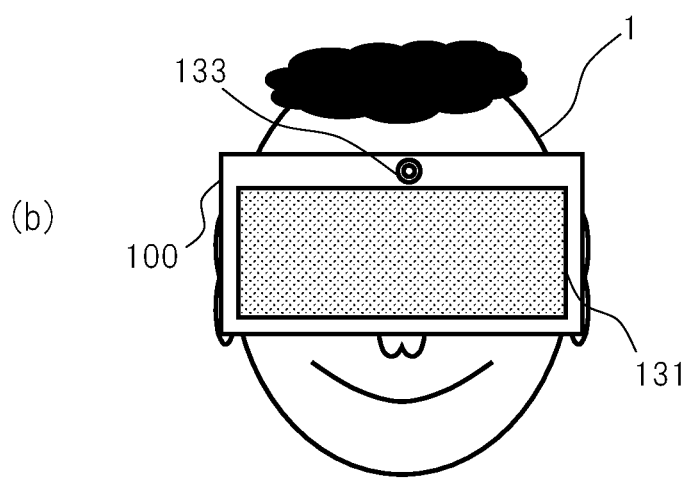
(b)
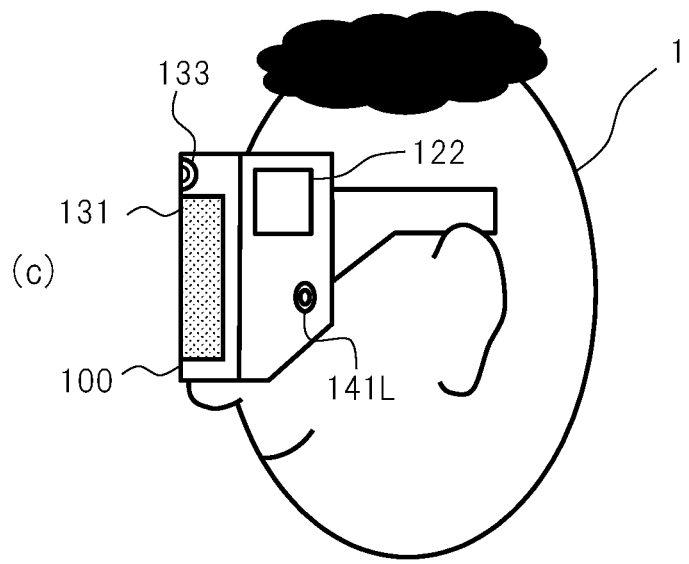
(c)

FIG. 4
(a)
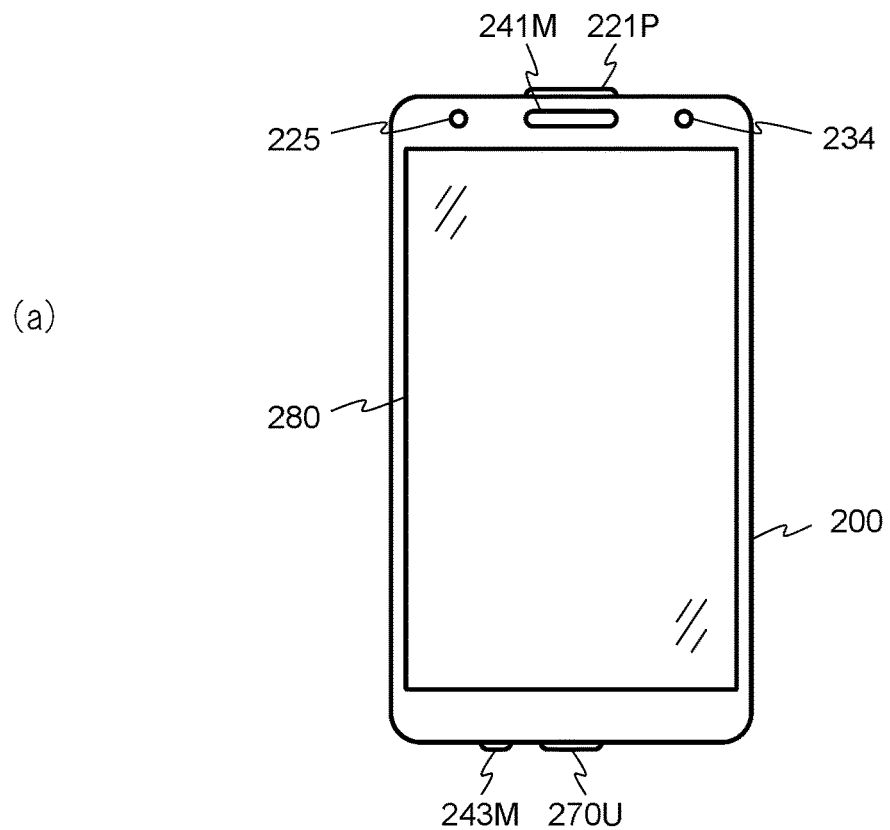
(b)
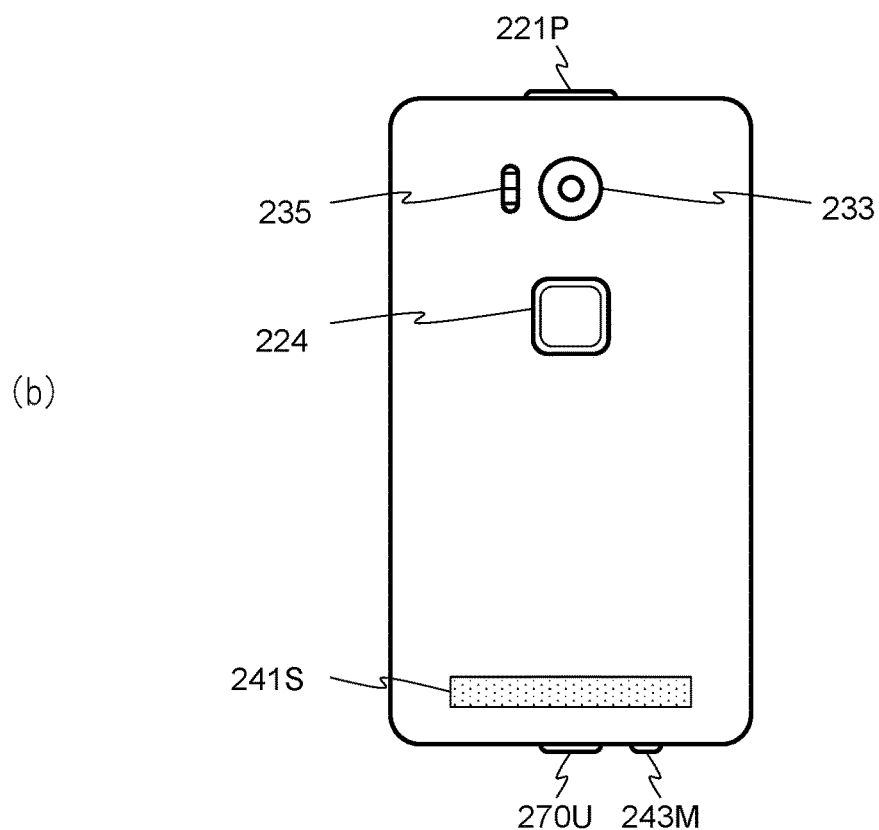

FIG. 8

| IMAGE-CAPTURING PROPRIETY INFORMATION ||||
| --- | --- | --- | --- |
| TERMINAL IDENTIFICATION INFORMATION | DATE AND TIME OF GENERATION | POSITION INFORMATION (LATITUDE, LONGITUDE) | IMAGE-CAPTURING PROPRIETY SETTING INFORMATION |
| xx.xx.xx.xx.xx.xx | 20xx/xx/xx xx:xx | (xxx.xxx,xxx.xxx) | DENIAL |
| xx.xx.xx.xx.xx.xx | 20xx/xx/xx xx:xx | (xxx.xxx,xxx.xxx) | DENIAL |
| xx.xx.xx.xx.xx.xx | 20xx/xx/xx xx:xx | (xxx.xxx,xxx.xxx) | ACCEPTANCE |
| ... | ... | ... | ... |

FIG. 15
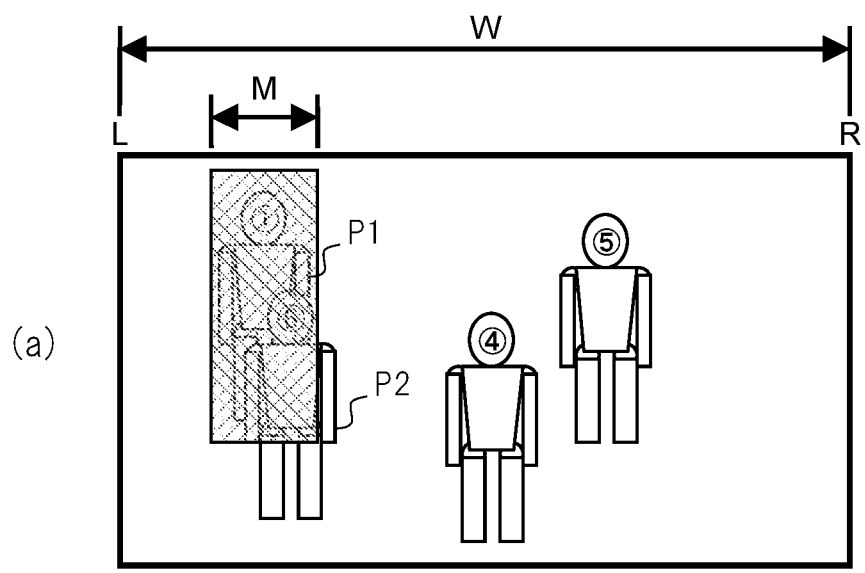
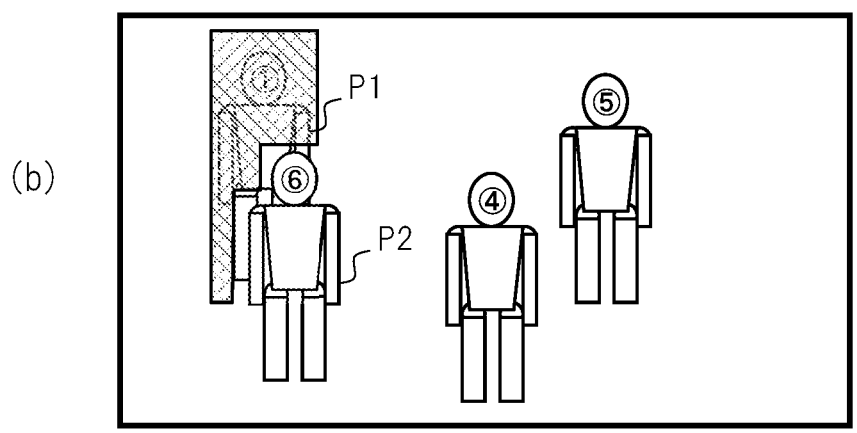

IMAGE PROCESSING APPARATUS AND IMAGE PROCESSING METHOD

TECHNICAL FIELD

The present invention relates to an image processing apparatus and an image processing method.

BACKGROUND ART

Conventionally, there is a technique of preventing an image capturing work when an image capturing terminal peripherally distributing an image capturing signal before image capturing receives an image-capturing denial signal that is transmitted to the image capturing terminal by a terminal having a denial setting status for the image capturing among terminals having received this image capturing signal (see, for example, a Patent Document 1).

RELATED ART DOCUMENT

Patent Document

Patent Document 1: Japanese Patent Application Laid-Open Publication No. 2004-88273

SUMMARY OF THE INVENTION

Problems to be Solved by the Invention

In the technique disclosed in the Patent Document 1, when the image capturing terminal receives the image-capturing denial signal, the image capturing cannot be performed. For example, when the image capturing is tried to be performed in a place where there are a lot of users holding the terminals, the image capturing cannot be performed at all if there is even only one terminal transmitting the image-capturing denial signal, and therefore, the technique has a problem incapable of always performing an appropriate control for the image capturing.

An object of the present invention is to perform the appropriate control for the image capturing while protecting privacy.

The above and other objects and novel characteristics of the present invention will be apparent from the description of the present specification and the accompanying drawings.

Means for Solving the Problems

As means for solving the issue, a technique described in claims is used.

As one example, an image processing apparatus performing an editing process to image information is exemplified, and includes: an image acquiring portion configured to acquire the image information; a position acquiring portion configured to acquire an image capturing position and an image capturing direction of the image information; an image-capturing propriety information acquiring portion configured to acquire image-capturing propriety information indicating that a position of an apparatus that transmits position information corresponds to information regarding the image-capturing propriety; an image editing portion configured to perform a masking process to a range based on the position of the apparatus that transmits the position information of the image-capturing propriety information in the image information acquired by the image acquiring portion, in accordance with information regarding image-capturing propriety in the image-capturing propriety information indicating that the position of the apparatus that transmits the position information of the image-capturing propriety information corresponds to the image capturing range based on the image capturing position and the image capturing direction acquired by the position acquiring portion; and an image output portion configured to output the image information edited by the image editing portion.

Effects of the Invention

By usage of a technique of the present invention, appropriate control for image capturing can be performed while protecting privacy.

BRIEF DESCRIPTIONS OF THE DRAWINGS

FIG. 2 is an explanatory diagram of an outline of an image capturing apparatus according to the present embodiment;

FIG. 4 is a diagram showing an outline of an information terminal according to the present embodiment;

FIG. 8 is a diagram of a data structure of image-capturing propriety information stored in the server apparatus;

FIG. 15 is an explanatory diagram of a specific example of the masking process.

BEST MODE FOR CARRYING OUT THE INVENTION

An example of an embodiment of the present invention will be explained below with reference to drawings.

Figure 1:
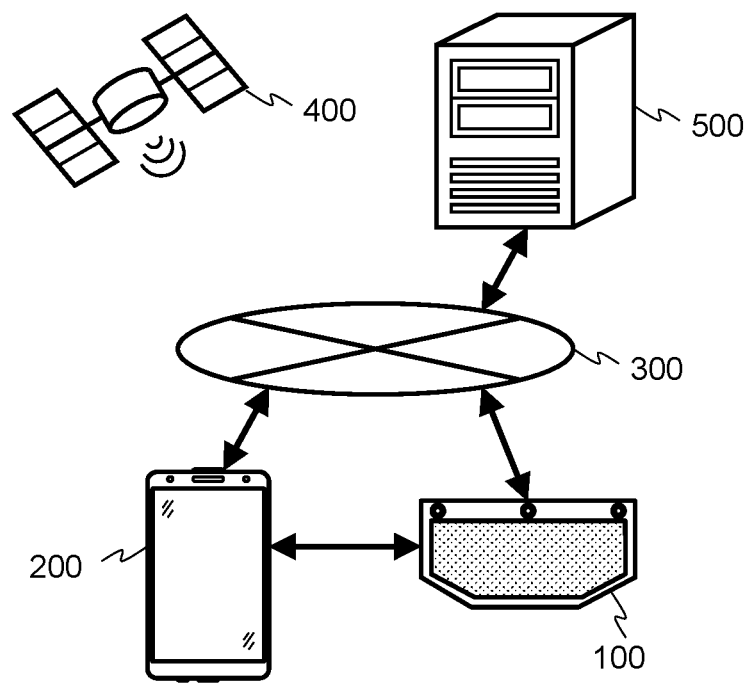
FIG. 1 is a configurational diagram of an information system of the present example according to the present embodiment.

FIG. 1 is a configurational diagram of an information system of the present example. This information system includes an image capturing apparatus 100, an information terminal 200, a GPS (Global Positioning System) satellite 400 and a server apparatus 500. The image capturing apparatus 100 is an apparatus capturing an image of a target. The image capturing apparatus 100 is, for example, a head mounted display, a smartphone, or a digital camera having a communication function. Also, the image capturing apparatus 100 performs a predetermined editing process to image information resulted from the image capturing. In other words, the image capturing apparatus 100 functions as an image processing apparatus.

The information terminal 200 is an apparatus transmitting information indicating the image-capturing propriety. The information terminal 200 is specifically a smartphone, a smartwatch or a wearable terminal (such as a wristband-type terminal).

The server apparatus 500 is a server apparatus managing the information indicating the image-capturing propriety. The image capturing apparatus 100 and the information terminal 200 transmit/receive the information to/from the server apparatus 500 through a network 300 (such as Internet). The GPS satellite 400 is a satellite apparatus transmitting a GPS signal.

Next, with reference to FIG. 2 (FIG. 2(a) to 2(c)), an outline of the image capturing apparatus 100 according to the present embodiment will be explained. Note that the image capturing apparatus 100 is an example of the head mounted display. FIG. 2 is a diagram showing the outline of the image capturing apparatus 100. Specifically, FIG. 2(a) is a top view of the image capturing apparatus 100 in a state in which a user 1 wears the image capturing apparatus 100. FIG. 2(b) is a front view of the image capturing apparatus 100. FIG. 2(c) is a side view of the image capturing apparatus 100. Note that an outline in a case of the smartphone used as the image capturing apparatus 100 may be the same as that of FIG. 4 described later.

The image capturing apparatus 100 is an apparatus recognizably displaying an application to the user and executing this application in a state in which the user 1 puts the image capturing apparatus 100 on the user's head. The image capturing apparatus 100 includes a first image input portion 133 capable of capturing an image of outside. Note that this may include a plurality of the first image input portions 133. Also, the image capturing apparatus 100 includes a display portion 131 that is transparent-type display means.

As shown in FIG. 2(c), the image capturing apparatus 100 includes an audio output portion 141 (such as an audio output portion 141L and an audio output portion 141R not illustrated). The image capturing apparatus 100 also includes a touch sensor 122. The image capturing apparatus 100 may also include a stereo microphone 143S or a charging terminal 170P not illustrated. Note that the display portion 131 may be non-transparent-type display means. In this case, the image capturing apparatus 100 displays the image-capturing result on the display means.

Figure 3:
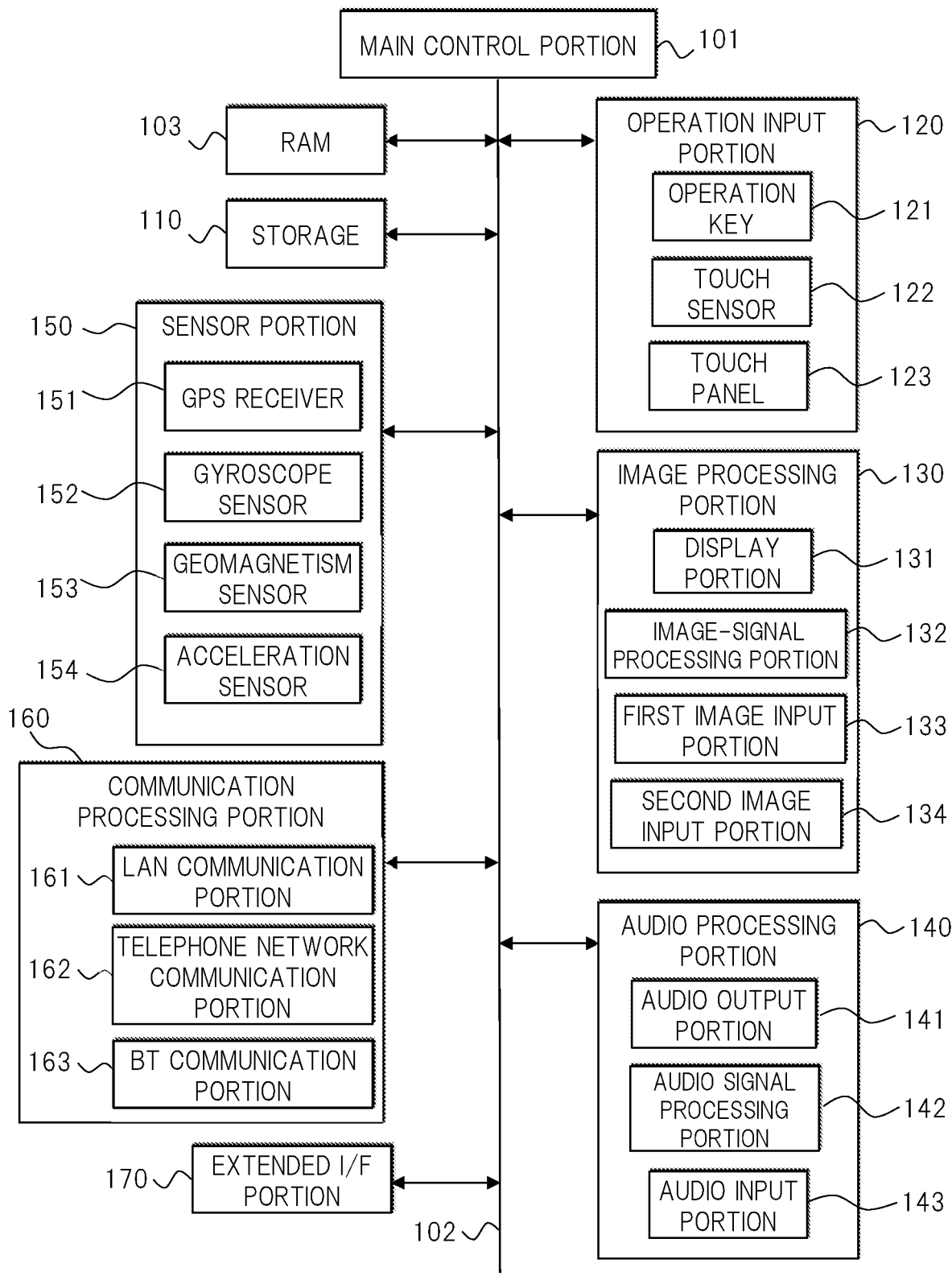
FIG. 3 is an explanatory diagram of a hardware configuration of the image capturing apparatus according to the present embodiment.

Next, a hardware configuration of the image capturing apparatus 100 will be explained with reference to FIG. 3. FIG. 3 is an explanatory diagram of the hardware configuration of the image capturing apparatus 100. The image capturing apparatus 100 includes a main control portion 101 to control each portion through a bus 102. This main control portion 101 is a CPU (Central Processing Unit) or others. The image capturing apparatus 100 also includes a RAM 103, a storage 110, an operation input portion 120, an image processing portion 130, an audio processing portion 140, a sensor portion 150, a communication processing portion 160 and an enhanced I/F portion 170.

The operation input portion 120 includes an operation key 121, a touch sensor 122 and a touch panel 123. The image processing portion 130 includes the display portion 131, an image-signal processing portion 132, the first image input portion 133 and a second image input portion 134. The audio processing portion 140 includes the audio output portion 141, an audio-signal processing portion 142 and an audio input portion 143. The sensor portion 150 includes a GPS receiver 151, a gyroscopic sensor 152, a geomagnetic sensor 153 and an acceleration sensor 154. The communication processing portion 160 includes a LAN communication portion 161, a telephone network communication portion 162 and a BT (Bluetooth (registered trademark)) communication portion 163.

The main control portion 101 is a calculation processing apparatus executing various functions by executing various information processing programs stored in the storage 110. The RAM 103 is a work area in the execution of the various programs. The storage 110 is a portion storing various pieces of information and images captured by the main control portion 101 using the first image input portion 133 or the second image input portion 134. The storage 110 is a nonvolatile storage medium such as a FlashROM or an EEPROM.

The operation input portion 120 is a user operation I/F receiving an operation input. The operation key 121 is a physical key (such as a power-on kay, a volume key or a home key) installed at a predetermined position of the image capturing apparatus 100. The touch sensor 122 is an input sensor installed in a housing of the image capturing apparatus 100 or others. The touch panel 123 is so-called touch panel, and is arranged to overlap the display portion 131. In the image capturing apparatus 100, note that an operation using a pointing device based on the Bluetooth connection may be applicable.

The image processing portion 130 is achieved by an image (video) processor or others. When the display portion 131 is a see-through (transparent) type display apparatus, the object is displayed to be transparent and overlap a practical image. Alternatively, when the display portion 131 is a non-transparent type display apparatus, the object is displayed to be non-transparent and overlap a camera-through image.

The image-signal processing portion 132 is an image signal processor, and is a portion analyzing the image captured by the first image input portion 133 or the second image input portion 134 and outputting a result of the analysis to the main control portion 101 or others. Also, the object to be output to the display portion 131 is generated by control of the main control portion 101.

The first image input portion 133 is a portion capturing the image of the outside. The second image input portion 134 is a portion capturing an eye image of the user 1. The eye image of the user 1 captured by the second image input portion 134 is used for detecting a line of sight.

The audio processing portion 140 is achieved by an audio processor or others. The audio output portion 141 is a speaker or others outputting sounds/voices. The audio-signal processing portion 142 is an audio signal processor analyzing the sounds/voices or others input from the audio input portion 143. The audio input portion 143 is a portion such as a microphone to which the sounds/voices of the user 1 or atmospheric sounds are input.

The sensor portion 150 is a portion acquiring information for use in identifying a position and a direction of the image capturing apparatus 100. The sensor portion 150 includes a GPS receiver 151, a gyroscopic sensor 152, a geomagnetic sensor 153 and an acceleration sensor 154.

The GPS receiver 151 acquires the GPS information resulted from the reception of the GPS signal. The gyroscopic sensor 152 has a function of detecting a movement orientation of the image capturing apparatus 100, and acquires the gyroscopic information indicating an angular speed data corresponding to directional change of the image capturing apparatus 100. The geomagnetic sensor 153 is one type of an orientational detecting apparatus detecting an angle representing absolute orientation of the image capturing apparatus 100 in accordance with geomagnetism. As such an angle, for example, an angle of azimuth can be exemplified. The acceleration sensor 154 has a function of detecting at least either one of an acceleration and a slope angle of the image capturing apparatus 100. The sensor portion 150 may further include a proximity sensor, an illumination sensor or others.

The communication processing portion 160 is a communication processor controlling the wireless communication. The communication processing portion 160 includes a LAN communication portion 161, a telephone-network communication portion 162 and a BT communication portion 163. An enhanced I/F portion 170 is an interface for connection with a peripheral apparatus.

Next, with reference to FIG. 4 (FIGS. 4(a) to 4(b)), an outline of the information terminal 200 according to the present embodiment will be explained. Note that the explanation will be made in a case of a smartphone as the information terminal 200. FIG. 4 is a diagram showing the outline of the information terminal 200. FIG. 4(a) is a front view of the information terminal 200, and FIG. 4(b) is a back view of the information terminal 200. The information terminal 200 includes an operation key 221 (such as an operation key 221P serving as a power-supply switch), a fingerprint sensor for use in authentication, an LED 225, a touch screen 280 functioning as a display portion 231. This touch screen 280 also functions as a touch panel 223.

The information terminal 200 includes a first image input portion 233 functioning as a back camera (out-camera), a second image input portion 234 functioning as a front camera (in-camera), a fill-light (auxiliary-light) emitting portion 235 functioning as a flash light or a strobe light, an audio output portion 241S, an audio output portion 241M, an audio input portion 243M and an USB terminal 270U. The audio output portion 241S is a stereo speaker used in an AV reproduction, and the audio output portion 241M is a monaural speaker used in chatting (talking). The audio input portion 243M is a monaural microphone. The USB terminal 270U is so-called enhanced interface portion used in charging and connection with a different USB apparatus.

Figure 5:
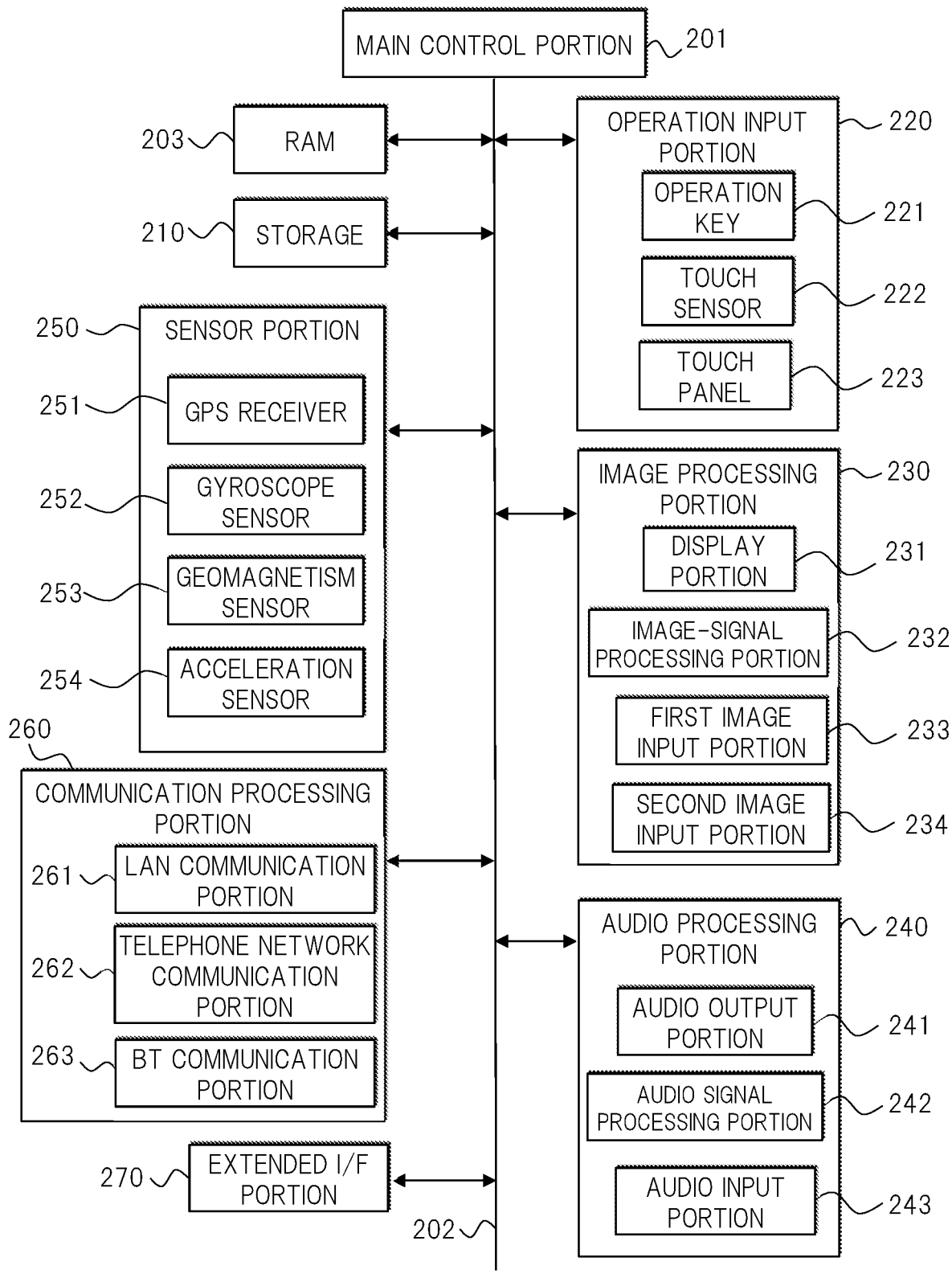
FIG. 5 is an explanatory diagram of a hardware configuration of the information terminal according to the present embodiment.

Next, a hardware configuration of the information terminal 200 will be explained with reference to FIG. 5. FIG. 5 is an explanatory diagram of the hardware configuration of the information terminal 200. The information terminal 200 includes a main control portion 201 to control each portion through a bus 202. The main control portion 201 is a CPU (Central Processing Unit) or others. The information terminal 200 includes an RAM 203, a storage 210, an operation input portion 220, an image processing portion 230, an audio processing portion 240, a sensor portion 250, a communication processing portion 260 and an enhanced I/F portion 270.

The operation input portion 220 includes an operation key 221, a touch sensor 222 and a touch panel 223. The image processing portion 230 includes a display portion 231, an image-signal processing portion 232, a first image input portion 233 and a second image input portion 234. The audio processing portion 240 includes an audio output portion 241, an audio-signal processing portion 242, and an audio input portion 243. The sensor portion 250 includes a GPS receiver 251, a gyroscopic sensor 252, a geomagnetic sensor 253 and an acceleration sensor 254. The communication processing portion 260 includes a LAN communication portion 261, a telephone-network communication portion 262 and a BT (Bluetooth (registered trademark)) communication portion 263.

The main control portion 201 is a calculation processing apparatus executing various functions by executing various information processing programs stored in the storage 210. The RAM 203 is a work area in the execution of the various programs. The storage 210 is a portion storing various pieces of information and images captured by the main control portion 201 using the first image input portion 233 and the second image input portion 234. The storage 210 is a nonvolatile storage medium such as a FlashROM or an EEPROM.

The operation input portion 220 is a user operation I/F receiving an operation input. The operation key 221 is a physical key (such as a power-on kay, a volume key or a home key) installed at a predetermined position of the information terminal 200. The touch sensor 222 is an input sensor installed in a housing of the information terminal 200 or others. The touch panel 223 is included in the information terminal 200, and is achieved by a touch screen 280 shown in FIG. 4. In the information terminal 200, note that an operation using a pointing device based on the Bluetooth connection may be applicable.

The image processing portion 230 is achieved by an image (video) processor or others. In the display 231, an object can be displayed to overlap a camera-through image. When the information terminal 200 is a wristband-type terminal or others, the display portion 231 may be removed.

The image-signal processing portion 232 is an image signal processor, and is a portion analyzing the image captured by the first image input portion 233 or the second image input portion 234 and outputting a result of the analysis to the main control portion 201 or others. Also, the object to be output to the display portion 231 is generated by control of the main control portion 201.

The first image input portion 233 is a portion capturing the image of the outside. The second image input portion 234 is a portion capturing an eye image of the user 1.

The audio processing portion 240 is achieved by an audio processor or others. The audio output portion 241 is a speaker or others outputting sounds/voices. The audio-signal processing portion 242 is an audio signal processor analyzing the sounds/voices or others input from the audio input portion 243. The audio input portion 243 is a portion such as a microphone to which the sounds/voices of the user or atmospheric sounds are input.

The sensor portion 250 is a portion acquiring information for use in identifying a position and a direction of the information terminal 200. The sensor portion 250 includes a GPS receiver 251, a gyroscopic sensor 252, a geomagnetic sensor 253 and an acceleration sensor 254.

The GPS receiver 251 acquires the GPS information resulted from the reception of the GPS signal. The gyroscopic sensor 252 has a function of detecting a movement orientation of the information terminal 200, and acquires the gyroscopic information indicating an angular speed data corresponding to directional change of the information terminal 200. The geomagnetic sensor 253 is one type of an orientational detecting apparatus detecting an angle representing absolute orientation of the information terminal 200 in accordance with geomagnetism. As such an angle, for example, an angle of azimuth can be exemplified. The acceleration sensor 254 has a function of detecting at least either one of an acceleration and a slope angle of the information terminal 200. The sensor portion 250 may further include a proximity sensor, an illumination sensor or others.

The communication processing portion 260 is a communication processor controlling the wireless communication. The communication processing portion 260 includes a LAN communication portion 261, a telephone-network communication portion 262 and a BT communication portion 263. The enhanced I/F portion 270 is an interface for connection with a peripheral apparatus.

Figure 6:
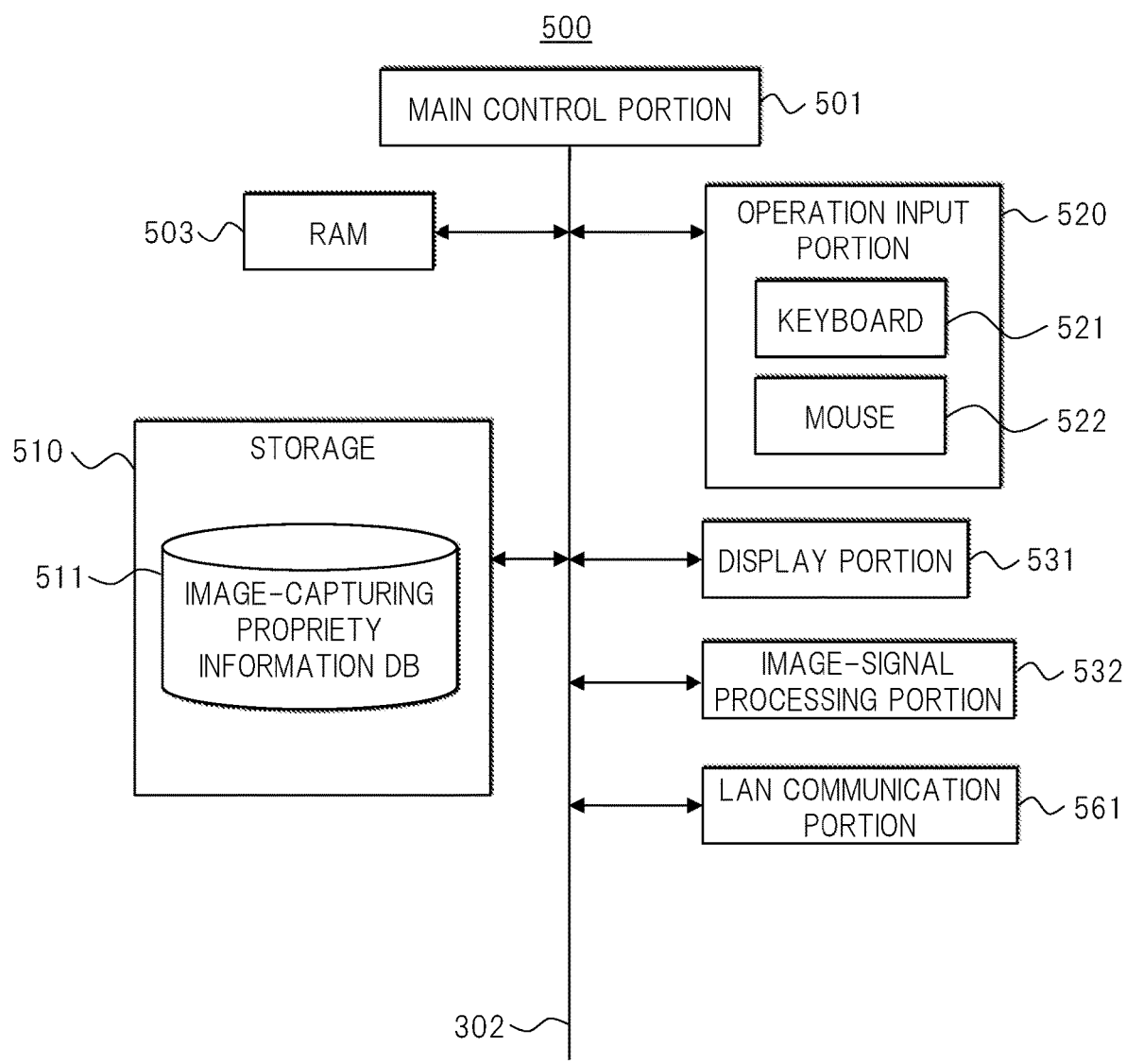
FIG. 6 is an explanatory diagram of a hardware configuration of a server apparatus according to the present embodiment.

Next, a hardware configuration of a server apparatus 500 will be explained with reference to FIG. 6. FIG. 6 is an explanatory diagram of the hardware configuration of the server apparatus 500. The server apparatus 500 includes a main control portion 501 to control each portion through a bus 502. The main control portion 501 is a CPU (Central Processing Unit) or others. The server apparatus 500 includes a RAM 503, a storage 510, an operation input portion 520, a display portion 531, an image-signal processing portion 532 and a LAN communication portion 561.

The storage 510 is a nonvolatile storage medium or others, and includes an image-capturing propriety information database 511.

The image-capturing propriety information database 511 is a database storing information of a status of the image-capturing propriety of a plurality of information terminals 200. The details will be described later.

The display portion 531 is a display or others, the image-signal processing portion 532 is a video signal processor, and the LAN communication portion 561 is an interface for communication with the information terminal 200 or the image capturing apparatus 100.

The server apparatus 500 registers the image-capturing propriety information into the image-capturing propriety information database 511 when receiving the image-capturing propriety information from the information terminal 200. Also, the server apparatus 500 acquires the image-capturing propriety information from the image-capturing propriety information database 511 when receiving a transmission request for the image-capturing propriety information from the image capturing apparatus 100, and transmits the information to the image capturing apparatus 100.

The server apparatus 500 may perform a publicly-known authentication processing (such as identification using an ID or a password or others) to an apparatus accessing to itself.

Note that the server apparatus 500 may be achieved to be made of a single apparatus or a plurality of apparatuses.

Figure 7:
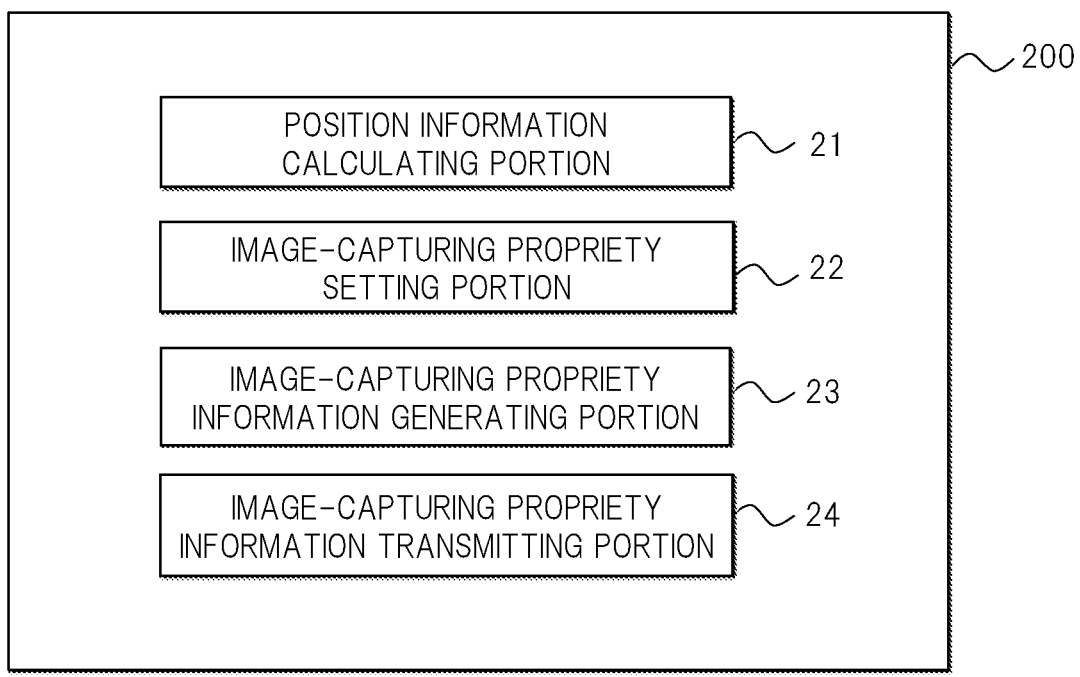
FIG. 7 is a functional block diagram of the information terminal according to the present embodiment.

Next, a function of the information terminal 200 will be explained with reference to FIG. 7. FIG. 7 is a functional block diagram of the information terminal 200. The information terminal 200 includes a position information calculating portion 21, an image-capturing propriety setting portion 22, an image-capturing propriety information generating portion 23 and an image-capturing propriety information transmitting portion 24. The information terminal 200 also has other function than the functions shown in FIG. 7. For example, the information terminal 200 has a function of controlling the information terminal 200 itself or others.

The position information calculating portion 21 is a portion calculating a position of the information terminal 200. The position information calculating portion 21 calculates the position of the information terminal 200 by using a publicly-known technique in accordance with, for example, the GPS signal acquired from the GPS receiver 251. Note that the position information calculating portion 21 may calculate the position of the information terminal 200 by using a publicly-known positioning technique using other information than the GPS signal or others. The position information calculating portion 21 calculates the position of the information terminal 200 at a predetermined timing, and transmits the calculated information as position information to the image-capturing propriety information generating portion 23.

The image-capturing propriety setting portion 22 is a portion setting information indicating the image-capturing propriety. To the storage 210 or others, the image-capturing propriety setting portion 22 sets the information indicating the image-capturing propriety that is input through, for example, the operation input portion 220 by the user.

The image-capturing propriety information generating portion 23 is a portion generating the image-capturing propriety information. Here, the image-capturing propriety information is information including information indicating that the position of the apparatus itself corresponds to the information indicating the image-capturing propriety for periphery of the apparatus itself (such as the user of the apparatus itself).

The image-capturing propriety information generating portion 23 determines whether to transmit the image-capturing propriety information at a predetermined timing. For example, this determines whether to transmit the image-capturing propriety information at a timing of, for example, the acquisition of the position information calculated by the position information calculating portion 21.

The image-capturing propriety information generating portion 23 determines first whether the image-capturing propriety information has been already transmitted when acquiring the position information from the position information calculating portion 21. If the image-capturing propriety information has not been transmitted (there is no history information in the image-capturing propriety information), the image-capturing propriety information generating portion 23 generates the image-capturing propriety information including the acquired position information, contents of the image-capturing propriety (the image-capturing propriety setting information) set by the image-capturing propriety setting portion 22, date and time and information for identifying the apparatus itself (terminal identification information), and transmits this information to the image-capturing propriety transmitting portion 24. The image-capturing propriety information generating portion 23 stores the transmitted image-capturing propriety information as the history information into the storage 210 or others.

If there is the history information, the image-capturing propriety information generating portion 23 compares the acquired position information and position information of the image-capturing propriety information that is the history information, and determines whether a distance between the positions is equal to or larger than a predetermined reference distance. If the distance is equal to or larger than the predetermined reference distance, the image-capturing propriety information generating portion 23 generates the image-capturing propriety information, transmits this image-capturing propriety information to the image-capturing propriety information transmitting portion 24, and updates the history information to this the image-capturing propriety information.

The image-capturing propriety information generating portion 23 compares the position information of the image-capturing propriety information that is the history information and the acquired position information. If the distance is not equal to or larger than the predetermined reference distance, the image-capturing propriety information generating portion 23 compares the date and time of the history information and the current date and time, and determines whether a predetermined reference elapse time or longer elapses. If the predetermined reference elapse time or longer does not elapse, the image-capturing propriety information generating portion 23 does not generate the image-capturing propriety information.

The image-capturing propriety information generating portion 23 compares the date and time of the history information and the current date and time. If the predetermined reference elapse time or longer elapses, the image-capturing propriety information generating portion 23 generates the image-capturing propriety information, transmits this image-capturing propriety information to the image-capturing propriety information transmitting portion 24, and updates the history information to this the image-capturing propriety information.

To the server apparatus 500, the image-capturing propriety information transmitting portion 24 transmits the image-capturing propriety information acquired from the image-capturing propriety information generating portion 23. The server apparatus 500 stores this image-capturing propriety information into a storage (the image-capturing propriety information DB 511) of the apparatus itself.

Here, a data structure example in a case of the server apparatus 500 storing the image-capturing propriety information will be explained with reference to FIG. 8. FIG. 8 is a diagram of the data structure of the image-capturing propriety information stored in the server apparatus 500. The image-capturing propriety information includes the terminal identification information, the date and time, the position information and the image-capturing propriety setting information.

If "Denial" is set as the image-capturing propriety setting information, this case means that the user of the information terminal 200 denies the image capturing. If "Acceptance" is set as the image-capturing propriety setting information, this case means that the user of the information terminal 200 accepts the image capturing.

Figure 9:
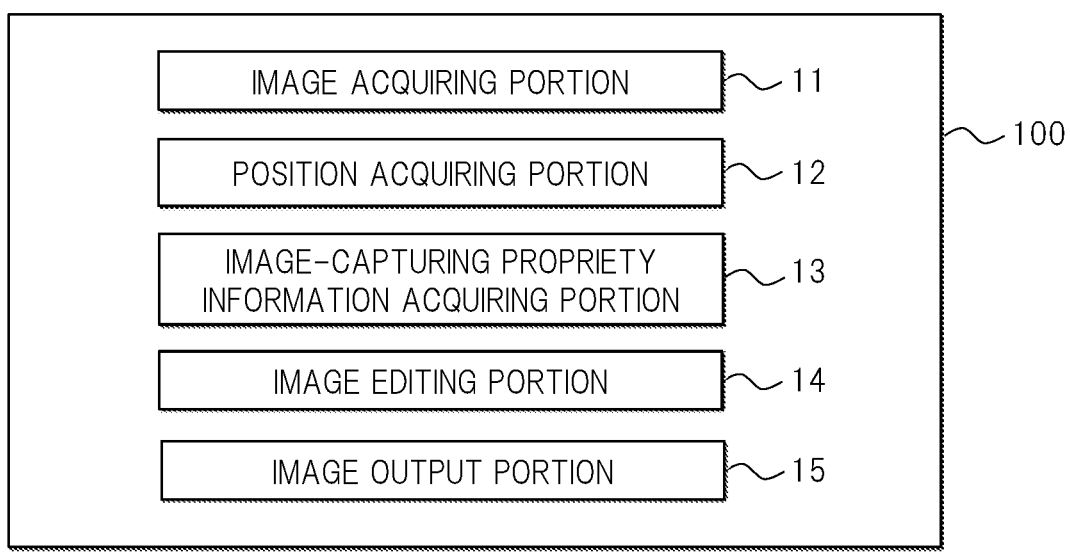
FIG. 9 is a functional block diagram of the image capturing apparatus according to the present embodiment.

Next, a function of the image capturing apparatus 100 will be explained with reference to FIG. 9. FIG. 9 is a functional block diagram of the image capturing apparatus 100. The image capturing apparatus 100 includes an image acquiring portion 11, a position acquiring portion 12, an image-capturing propriety information acquiring portion 13, an image editing portion 14 and an image output portion 15.

The image acquiring portion 11 is a portion acquiring a peripheral image information resulted from the image capturing of the image capturing apparatus 100. For example, as the peripheral image information resulted from the image capturing of the image capturing apparatus 100, the image acquiring portion 11 acquires the image information generated by the image-capturing process in the first image input portion 133. The image acquiring portion 11 transmits the acquired image information to the image editing portion 14. The image acquiring portion 11 notifies the position acquiring portion 12 and the image-capturing propriety information acquiring portion 13 of the acquisition of the image information.

The position acquiring portion 12 is a portion acquiring an image capturing position and an image capturing direction of the image. The acquisition of position acquiring portion 12 is triggered by, for example, the acquisition of the notification about the acquisition of the image information from the image acquiring portion 11, and acquires the image capturing position and the image capturing direction of the image. When the image is captured by the apparatus itself, the position acquiring portion 12 acquires a position and an image capturing direction of the apparatus itself from the sensor portion 150. The position acquiring portion 12 transmits the acquired image capturing position and the acquired image capturing direction to the image editing portion 14. Note that the position acquiring portion 12 may transmit this image capturing position to the image-capturing propriety information acquiring portion 13. If the image capturing apparatus 100 acquires the image information from a different apparatus, the position acquiring portion 12 may acquire an image capturing position and an image capturing direction of this different apparatus.

The image-capturing propriety information acquiring portion 13 is a portion acquiring the image-capturing propriety information from the server apparatus 500. The image-capturing propriety information acquiring portion 13 is triggered by, for example, the acquisition of the notification about the acquisition of the image information from the image acquiring portion 11, and acquires the image-capturing propriety information. The image-capturing propriety information acquiring portion 13 also may acquire the image capturing position from the position acquiring portion 12, and transmit this image capturing position to the server apparatus 500, and besides, acquire the image-capturing propriety information corresponding to this image capturing position from the server apparatus 500.

The image-capturing propriety information acquiring portion 13 transmits the acquired image-capturing propriety information to the image editing portion 14 when acquiring the image-capturing propriety information from the server apparatus 500.

The image editing portion 14 is a portion of performing a masking process to a range based on the position of the image-capturing propriety information in the image information acquired by the image-capturing acquiring portion 11, in accordance with the position information of the information terminal 200 and the image-capturing propriety setting information of the image-capturing propriety information corresponding to an image capturing range based on the image capturing position and the image capturing direction acquired by the position acquiring portion 12.

The image editing portion 14 acquires the image capturing position and the image capturing direction from the position acquiring portion 12. The image editing portion 14 also acquires the image-capturing propriety information from the image-capturing propriety information acquiring portion 13. The image editing portion 14 also acquires the image information from the image acquiring portion 11.

The image editing portion 14 identifies the image capturing range by using a publicly-known method in accordance with the acquired image capturing position and the acquired image capturing direction acquired from the position acquiring portion 12. The image editing portion 14 determines whether the position information of the image-capturing propriety information having the "Denial" setting as the setting information of the image-capturing propriety information is within the image capturing range. If the position information is within the image capturing range, the image editing portion 14 performs the masking process to the range corresponding to the information terminal 200 to be targeted at this position.

More specifically, the image editing portion 14 performs the masking process to a part of a person corresponding to this information terminal 200 as the range corresponding to this information terminal 200. Alternatively, the image editing portion 14 may perform the masking process to a face part of this person as the part of the person corresponding to this information terminal 200.

The image output portion 15 is a portion outputting the image information edited by the image editing portion 14. To the display portion 131, the image output portion 15 outputs the image information edited by the image editing portion 14. Alternatively, the image output portion 15 may register the image information edited by the image editing portion 14, into the storage 110.

Figure 10:
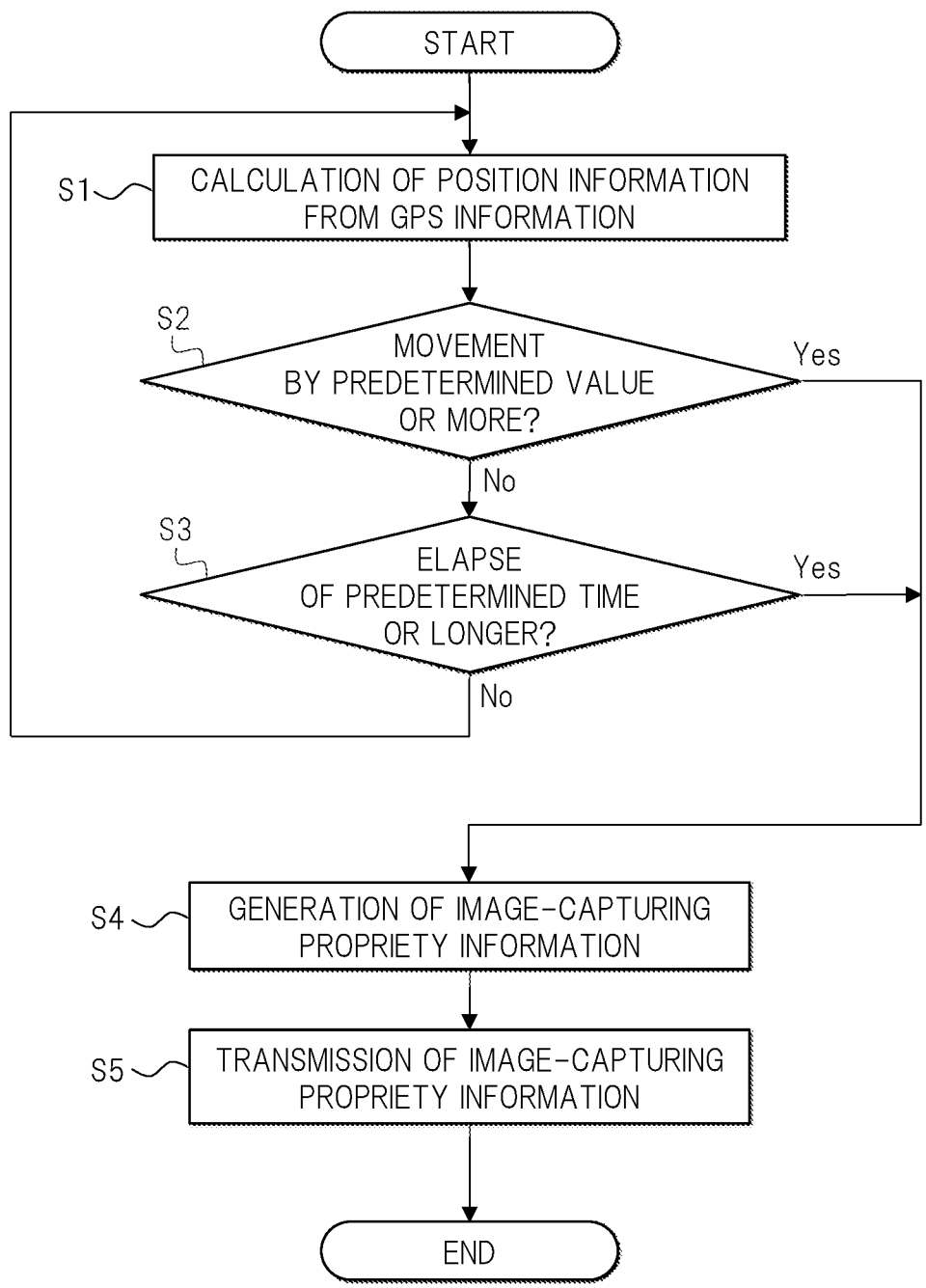
FIG. 10 is a flowchart showing a process procedure in the information terminal of generating the image-capturing propriety information and transmitting the information to the server apparatus.

Next, with reference to FIG. 10, a process procedure in the information terminal 200 generating the image-capturing propriety information and transmitting this information to the server apparatus 500 will be explained. FIG. 10 is a flowchart showing the process procedure in the information terminal 200 generating the image-capturing propriety information and transmitting this information to the server apparatus 500. It is assumed that the image-capturing propriety information has been already transmitted to the server apparatus 500, and assumed that the history information is stored.

First, the position information calculating portion 21 of the information terminal 200 calculates the position information by using the GPS signal (GSP information) received from the GPS receiver 251 (step S1).

The image-capturing propriety information generating portion 23 compares the position information of the image-capturing propriety information that is the history information and the calculated position information, and determines whether the distance is equal to or larger than the predetermined reference distance (step S2). If the distance is equal to or larger than the predetermined reference distance (step S2: Yes), the procedure proceeds to a step S4.

When the image-capturing propriety information generating portion 23 compares the position information of the image-capturing propriety information that is the history information and the calculated position information. If the distance is not equal to or larger than the predetermined reference distance (step S2: No), the image-capturing propriety information generating portion 23 compares the date and time of the generation of the history information and the current date and time, and determines whether the predetermined reference elapse time or longer has passed or not (step S3). If the predetermined reference elapse time or longer has not passed (step S3: No), the image-capturing propriety information is not generated, and the procedure proceeds to the step S1.

When the image-capturing propriety information generating portion 23 compares the date and time of the generation of the history information and the current date and time, if the predetermined reference elapse time or longer has passed (step S3: Yes), the procedure proceeds to a step S4.

In the step S4, the image-capturing propriety information generating portion 23 generates the image-capturing propriety information (step S4). To the server apparatus 500, the image-capturing propriety information transmitting portion 24 transmits the image-capturing propriety information that has been acquired from the image-capturing propriety information generating portion 23 (step S5). The server apparatus 500 stores this image-capturing propriety information into the storage of the apparatus itself.

Note that the server apparatus 500 may determine whether to perform the updating process of the image-capturing propriety information. In this case, the information terminal 200 does not store the history information, and generates the image-capturing propriety information and performs the transmitting process to the server apparatus 500 for each predetermined time interval. The server apparatus 500 may perform the process of the comparison between the stored position information and date and time of the generation and the newly-received position information and date and time of the generation for each piece of the image-capturing propriety information including the same terminal identification information, and determine whether to perform the updating process of the image-capturing propriety information in accordance with this comparison result.

Figure 11:
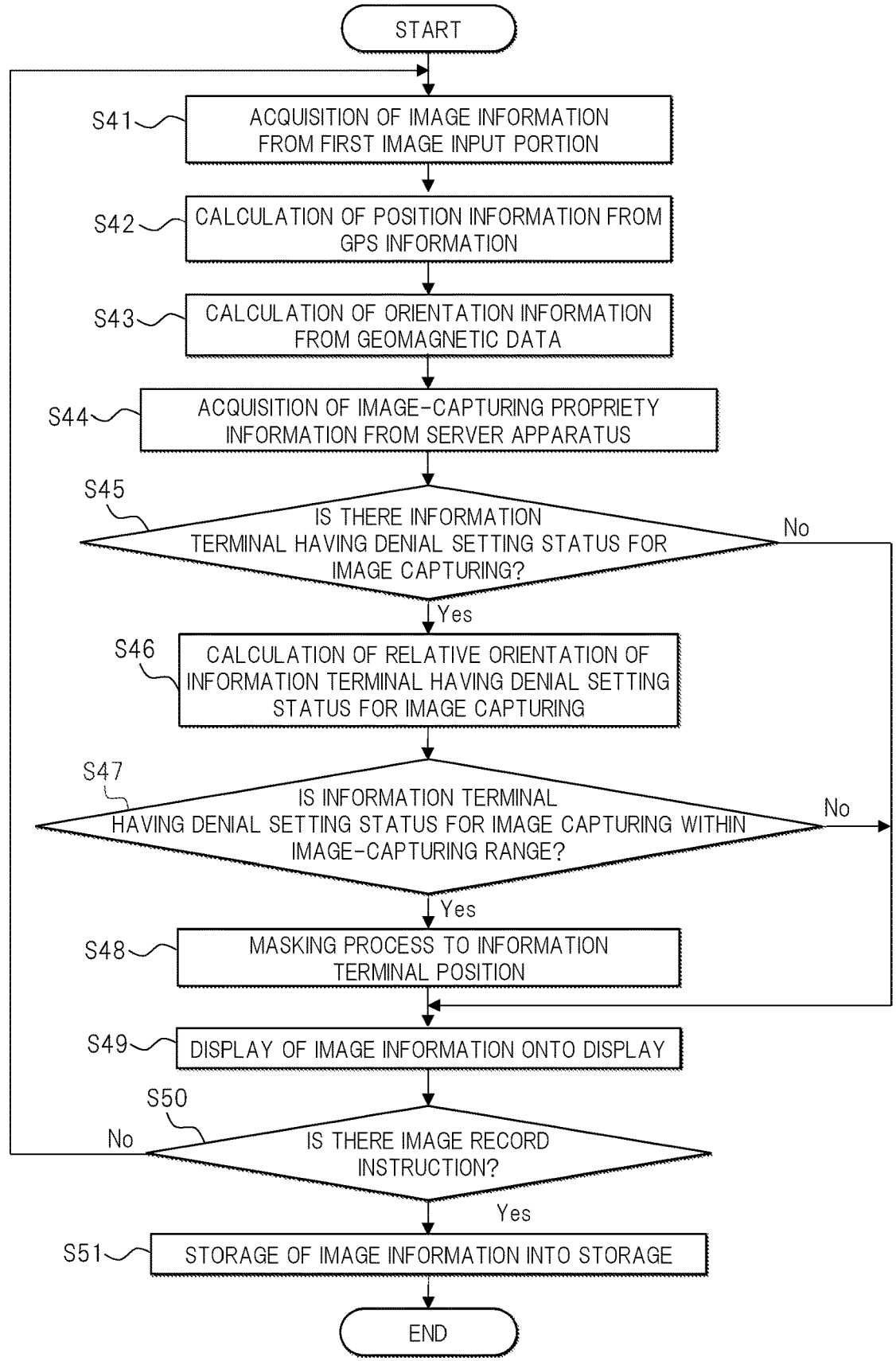
FIG. 11 is an explanatory flowchart of a process procedure in the image capturing apparatus of editing the image.

Next, with reference to FIG. 11, a process procedure of the image capturing apparatus 100 editing the image will be explained. FIG. 11 is an explanatory flowchart of the process procedure of the image edition.

First, the image acquiring portion 11 acquires the image information captured through the image capturing process by the first image input portion 133 (step S41).

Next, the position acquiring portion 12 calculates the position information by using the information (GPS information) acquired from the GPS receiver 151 (step S42). Also, the position acquiring portion 12 calculates the orientation information (information of the image capturing direction) by using the information acquired from the geomagnetic sensor 153 (step S43). Next, the image-capturing propriety information acquiring portion 13 requests the server apparatus 500 to transmit the image-capturing propriety information, and acquires the image-capturing propriety information from the server apparatus 500 (step S44). Note that image-capturing propriety information acquiring portion 13 may transmit the position information of the image capturing apparatus 100, and cause the server apparatus 500 to acquire the image-capturing propriety information of the information terminal 200 positioned within a predetermined range from the position of this image capturing apparatus 100.

The image editing portion 14 verifies whether the image-capturing propriety information acquired by the image-capturing propriety information acquiring portion 13 includes the image-capturing propriety information having the "Denial" setting status (step S45). If the information does not include the image-capturing propriety information having the "denial" setting status (step S45: No), the image editing portion 14 transmits the image information of the step S41 to the image output portion 15, and the procedure proceeds to a step S49.

If the information includes the image-capturing propriety information having the "Denial" setting status (step S45: Yes), the image editing portion 14 calculates a relative orientation of the information terminal 200 having transmitted the image-capturing propriety information with respect to a directional orientation of the image capturing apparatus 100 by using the position information acquired by the position acquiring portion 12, the orientation information and the position information acquired by the image-capturing propriety information acquiring portion 13 and included in the image-capturing propriety information (step S46). Note that a target terminal for the calculation of the relative orientation is assumed to be the information terminal 200 having transmitted the image-capturing propriety information having the "Denial" setting status. In a case of a plurality of pieces of the image-capturing propriety information having the "Denial" setting status, each information terminal 200 may be the target.

The image editing portion 14 verifies whether the position information of the information terminal 200 having transmitted the image-capturing propriety information having the "denial" setting status is within a range of an angle of image capturing view of the image capturing apparatus 100 in accordance with the orientation information of the image capturing apparatus 100, the angle of image capturing view of the image capturing apparatus 100 (preset information) and the relative orientation calculated in the step S46 (step S47).

If it is verified in the step S47 that the position information of any information terminal 200 having transmitted the image-capturing propriety information having the "denial" setting status is not within the range of the angle of image capturing view of the image capturing apparatus 100 (step S47: No), the image information in the step S41 done without the masking process is transmitted to the image output portion 15, and the procedure proceeds to a step S49.

If it is verified in the step S47 that the position information of any information terminal 200 having transmitted the image-capturing propriety information having the "denial" setting status is within the range of the angle of image capturing view of the image capturing apparatus 100 (step S47: Yes), the procedure proceeds to a step S48.

Figure 12:
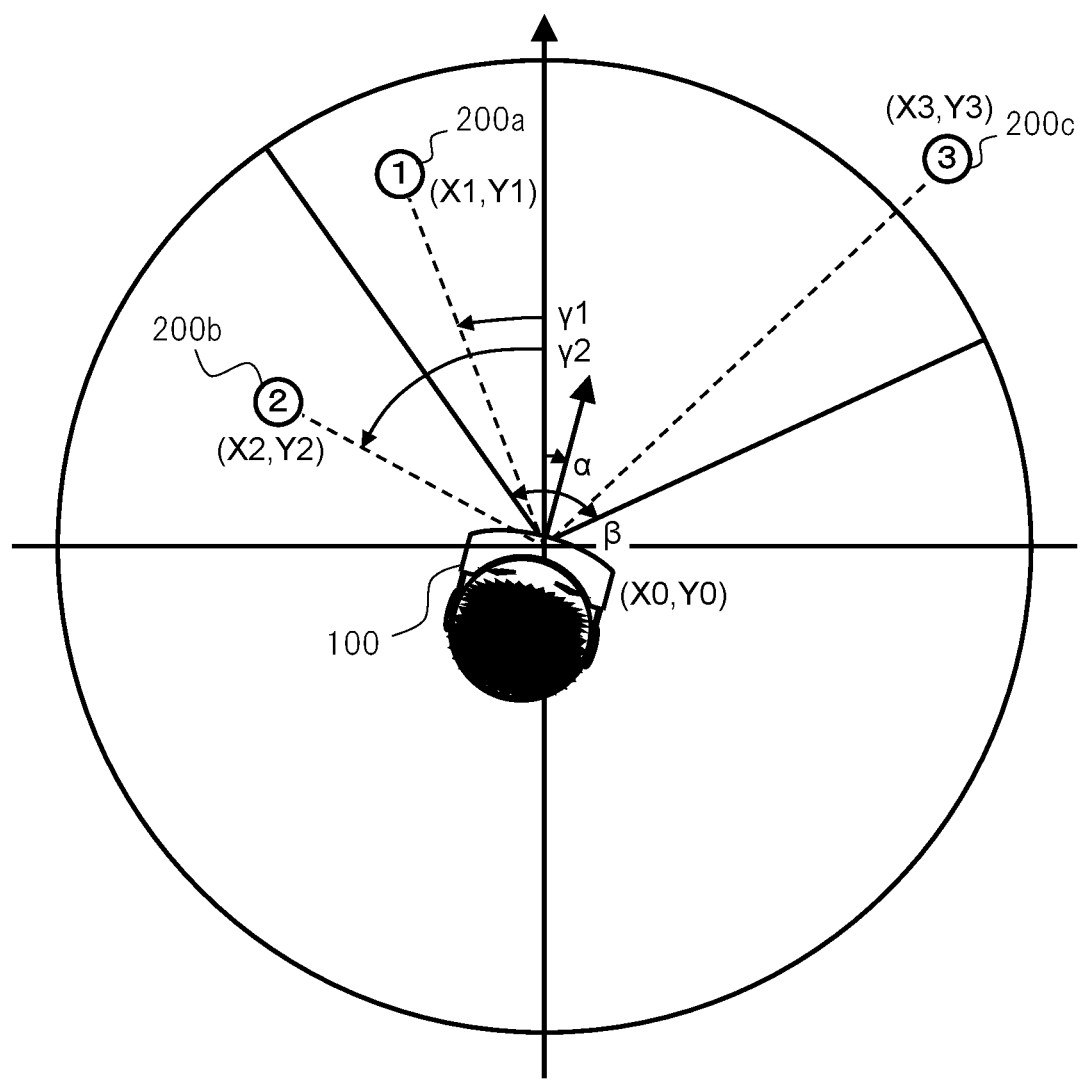
FIG. 12 is a diagram showing a positional relation between the image capturing apparatus and the information terminal.

Here, with reference to FIG. 12, a process content of the verification of whether the position information of any information terminal 200 having transmitted the image-capturing propriety information having the "denial" setting status is within the range of the angle of image capturing view of the image capturing apparatus 100 will be explained. FIG. 12 is a diagram showing the positional relation between the image capturing apparatus 100 and the information terminal 200.

The position information (X0, Y0) shown in FIG. 12 is current-position information of the image capturing apparatus 100 acquired by the position acquiring portion 12. The orientation information "α" shown in FIG. 12 is the orientation information calculated by the position acquiring portion 12. This orientation information "α" is a relative angle in a direction of the directionality of the image capturing apparatus 100 with respect to the reference orientation (true north, magnetic north or others). A circle shown in FIG. 12 is a circle centering the position information (X0, Y0) and having a radius of a predetermined distance.

The position information (X1, Y1) is position information of an information terminal 200a. The position information (X2, Y2) is position information of an information terminal 200b. The position information (X3, Y3) is position information of an information terminal 200c. If the image capturing apparatus 100 transmits the position information of the apparatus itself to the server apparatus 500, it is assumed that the information terminal 200c having the distance from the image capturing apparatus 100 larger than the predetermined distance is out of the image capturing range, and the image-capturing propriety information including the position information of this information terminal 200c may not be acquired.

Alternatively, the image editing portion 14 may not transmit the position information of the apparatus itself to the server apparatus 500 but exclude the image-capturing propriety information, that is out of the predetermined distance from the apparatus itself, from the target of the verification of whether the position information is within the range of the angle of the image capturing view in accordance with the position information of the acquired image-capturing propriety information. Even in this case, the image-capturing propriety information of the information terminal 200a and the information terminal 200b become the targets of the verification in the example of FIG. 12.

The image editing portion 14 calculates the relative angles γ1 and γ2 in the directions of the respective information terminals 200 (the information terminal 200a and the information terminal 200b) with respect to the reference orientation by using the position information of the information terminal 200a and the information terminal 200b and the position information of the image capturing apparatus 100. Next, the image editing portion 14 calculates the relative orientation of the image capturing apparatus 100. Specifically, the image editing portion 14 calculates "α−γ1" as the relative orientation with respect to the information terminal 200a. Also, the image editing portion 14 calculates "α−γ2" as the relative orientation with respect to the information terminal 200b. Note that a clockwise direction represents a positive value.

In the verifying process performed in the process of the step S47, an angle of image capturing view "β" of the first image input portion 133 of the image capturing apparatus 100 and the relative orientation are compared to each other. For example, in a case with a relation "(β/2)> the relative orientation (such as "α−γ1")", the image editing portion 14 determines that the information terminal 200 is within the range of the angle of the image capturing view of the image capturing apparatus 100. In a case without the relation "(β/2)> the relative orientation, the image editing portion 14 determines that the information terminal 200 is not within the range of the angle of the image capturing view of the image capturing apparatus 100.

In the example of FIG. 12, the image editing portion 14 determines that the information terminal 200a is within the range of the angle of the image capturing view while the information terminal 200b is not within the range of the angle of the image capturing view.

Figure 13:
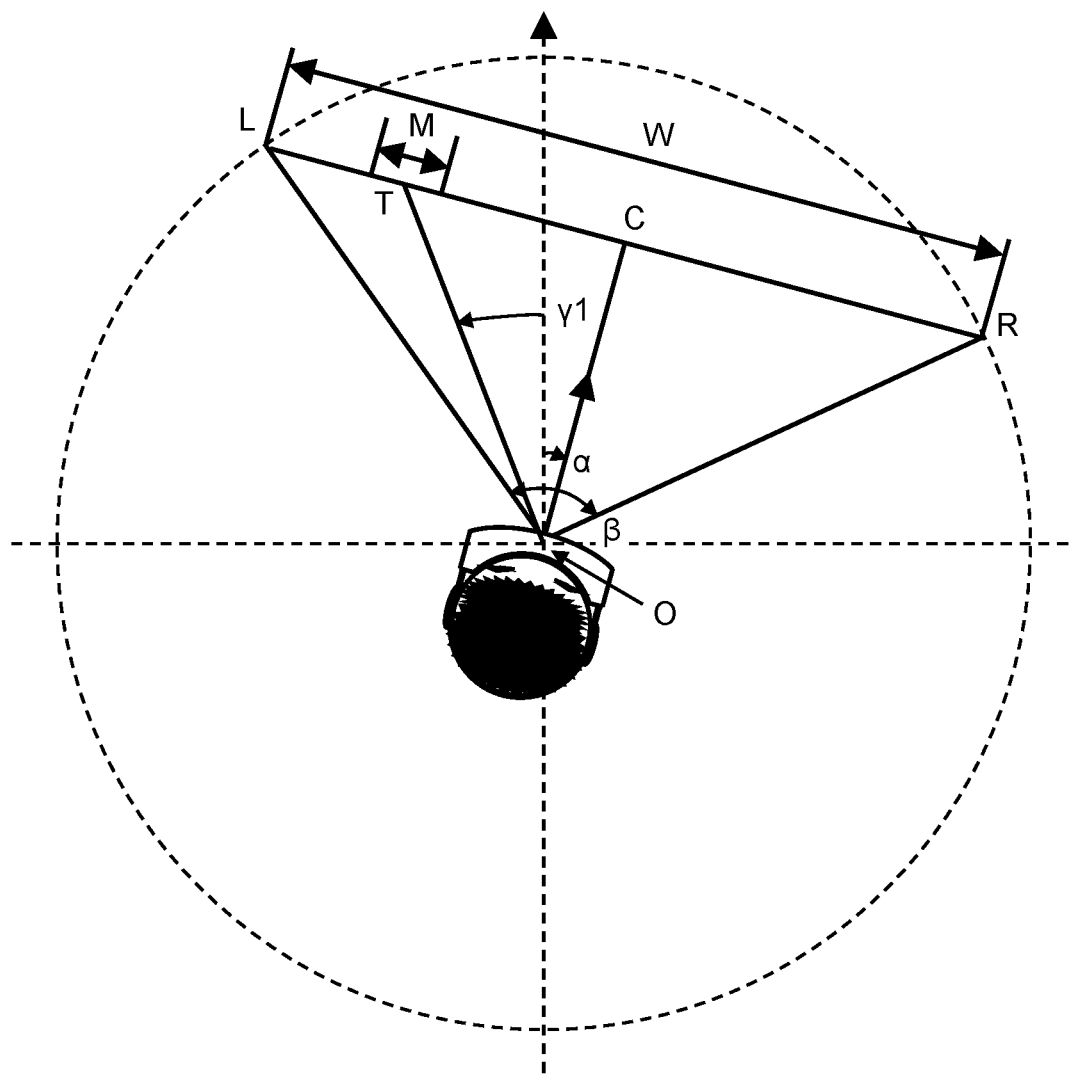
FIG. 13 is an explanatory diagram of a process for determining a range to be done with a masking process.
Figure 14:
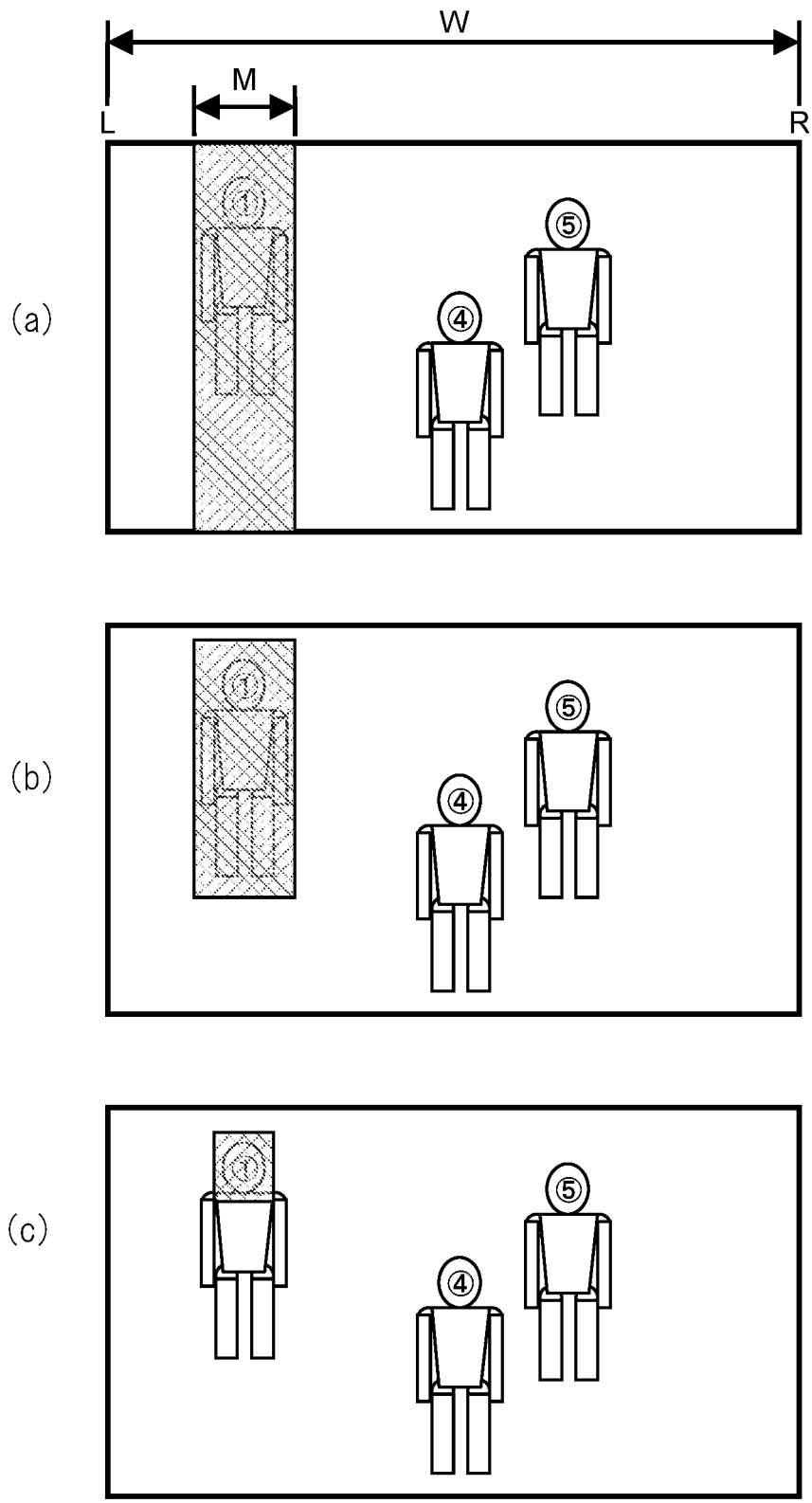
FIG. 14 is an explanatory diagram of a specific example of the masking process.

Returning to FIG. 11, the image editing portion 14 performs the masking process for the position of the information terminal 200 within the range of the angle of the image capturing view verified in the step S47 (step S48). Here, the masking process will be explained with reference to FIGS. 13, 14 and 15. FIG. 13 is an explanatory diagram of a process of determining a range of the masking process. Each of FIGS. 14 and 15 is an explanatory diagram of a specific example of the masking process.

First, the process of determining the range of the masking process will be explained with reference to FIG. 13. Terms "α", "β" and "γ" of FIG. 13 are the same as those of FIG. 12. A term "O" shown in FIG. 13 represents the reference position of the image capturing apparatus 100. Terms "L" and "R" shown in FIG. 13 represent a left end and a right end of the image capturing range "W", respectively. A term "C" shown in FIG. 13 represents a center of the image capturing range "W". A term "T" shown in FIG. 13 represents the position of the information terminal 200 (the position of the information terminal 200b shown in FIG. 12) within the image capturing range "W" of the image capturing apparatus 100. A masked region "M" shown in FIG. 13 represents a masked region within the image capturing range "W" of the image capturing apparatus 100.

The image editing portion 14 sets the masked region M in accordance with the following items (1) to (4). (1) A ratio of a length "L-C" and a length "T-C" is equal to a ratio of "tan (β/2)" and "tan (α−γ1)". (2) The length "L-C" corresponds to a half of the number of pixels capable of being acquired by the image capturing element of the image capturing apparatus 100. (3) The position T of the information terminal 200 within the image capturing range "W" is calculated in accordance with the items (1) and (2). (4) The masked region M centering the position T and having a predetermined width is calculated. Note that the width of the masked region M may be changed in accordance with a range of the person's specific part acquired by the image analysis.

Next, the specific example of the masking process will be explained with reference to FIGS. 14 and 15. As a method of the masking process, a method of the masking process to the entire masked region M calculated in FIG. 13 is exemplified as shown in FIG. 14(a). Alternatively, a method of the masking process to only the person part identified from the masked region M by the publicly-known image analysis method is exemplified as shown in FIG. 14(b). Alternatively, a method of the masking process to only the person's face part identified from the masked region M by the publicly-known image analysis method is exemplified as shown in FIG. 14(c).

A process example in a case in which the masked region M includes the plurality of information terminals 200 will be explained with reference to FIG. 15. As shown in FIG. 15(a), the masking process may be performed to the masked region M as similar to the process of FIG. 14(b). When the "denial" status is set to an information terminal 200 belonging to a position P1 while the "denial" status is not set to an information terminal 200 belonging to a position P2, the masking process may be performed to only a person at the position P1 if, for example, the position P2 is closer than (in front of) the position P1 in accordance with the positional relation between the position P1 and the position P2 as shown in FIG. 15(b).

Returning to FIG. 11, the image editing portion 14 transmits the masking process result in the step S48 to the image output portion 15, and the procedure proceeds to a step S49. In the step S49, the image output portion 15 displays the acquired image information onto the display portion (step S49).

Here, if there is no image record instruction from the user operation (step S50: No), the procedure proceeds to the step S41. In the step S50, if there is the image record instruction (step S50: Yes), the image output portion 15 registers this image information into the storage 110 (step S51), and the process ends.

In the steps S46 and S47 of the above-described example, the verification of whether the position information of the information terminal 200 is within the range of the angle of view "β" has been described. However, it may be also verified whether the position information of the information terminal 200 is within a new range that shifts by a predetermined range from the angle of view "β". If the denying information terminal 200 is within the range of the angle of view "β" but not within the new range, the image information done with the masking process based on the original angle of view "β" is displayed, and it can be also notified that an image done without the masking process can be provided by the shifting of the predetermined range.

In the above-described example, the case of the single image capturing apparatus 100 capturing the image and editing the captured image information has been described. However, the processes may be achieved by a plurality of apparatuses. For example, an apparatus capturing the image may separate from an apparatus acquiring the image information from this image capturing apparatus and editing this image information.

The case of the information terminal 200 generating and transmitting the image-capturing propriety information has been described. However, an apparatus at a fixed position (such as an apparatus fixed to periphery of an exhibited object denying the image capturing) may transmit the image-capturing propriety setting information and the position information of the apparatus itself.

The case of the information terminal 200 transmitting the image-capturing propriety information to the server apparatus 500 through the network 300 has been described. However, the image-capturing propriety information may be directly transmitted to the image capturing apparatus by communication means such as near-field wireless communication.

In the above-described example, the case of the image capturing apparatus 100 executing the masking process has been described, the making process executed to the position of the information terminal 200 having the "denial" setting status as the image-capturing propriety setting information (the process of preventing the easiness of the viewing of the periphery of the information terminal 200) in the image-capturing propriety information indicating that the position of the information terminal 200 is within the image capturing range. Alternatively, the image capturing apparatus 100 may execute a process of cancelling the masking as the masking process to the position of the information terminal 200 having the "acceptance" setting status as the image-capturing propriety setting information. When the image capturing is performed in a place where, for example, the image capturing is not allowed in principle, the process may be executed.

As described above, in the image capturing apparatus 100, the image acquiring portion 11 acquires the image information (such as the image information generated by capturing an image of the periphery of the image capturing apparatus 100). The position acquiring portion 12 also acquires the information of the image capturing position of the image information and the image capturing direction. The image-capturing propriety information acquiring portion 13 acquires the image-capturing propriety information in which the position of the information terminal 200 is corresponded to the image-capturing propriety setting information (the information regarding the image-capturing propriety). The image editing portion 14 performs the masking process to the range based on the information terminal 200 in the image information acquired by the image acquiring portion 11 in accordance with the image-capturing propriety setting information of the image-capturing propriety information indicating that the position of the information terminal 200 in the image-capturing propriety information corresponds to the image capturing range based on the image capturing position and the image capturing direction acquired by the position acquiring portion 12.

In this case, if the position of the information terminal 200 is within the image capturing range of the image information, the image capturing apparatus 100 performs the masking process to the range based on this information terminal 200 in the image information in accordance with the image-capturing propriety setting information of this information terminal 200. Therefore, by the limitation of the part to be done with the masking process, the appropriate control for the image capturing can be performed while the privacy is protected.

For example, the image editing portion 14 performs the masking process to the range corresponding to the information terminal 200 having the "denial" setting status as the image-capturing propriety setting information. In this case, the privacy of the user denying the image capturing is protected since the masking process is performed to only a predetermined range based on the information terminal 200 having the "denial" setting status, and besides, the appropriate control for the image capturing can be performed since the imaging process is not particularly performed to other parts.

The part to be done with the masking process is limited since the image editing portion 14 performs the masking process to the part of the person or the face of the person corresponding to the position of the information terminal 200 having the "denial" setting status as the image-capturing propriety setting information, and therefore, the appropriate control for the image capturing is achieved.

A part or all of the functions of the present invention or others may be achieved by, for example, hardware obtained by designing of an integrated circuit or others. Alternatively, a part or all of them may be achieved by software obtained by interpreting and executing an operational program that makes a microprocessor or others achieve each function or others. The hardware and the software may be used together.

As the control lines and the information lines shown in the drawings, the one that is necessary for the explanation is illustrated. All of the control lines and the information lines on a product are not always illustrated. It is practically conceivable that almost all the configurations are connected to one another.

As the control lines and the information lines shown in the drawings, the one that is necessary for the explanation is illustrated. All of the control lines and the information lines on a product are not always illustrated. It is practically conceivable that almost all the configurations are connected to one another.

EXPLANATION OF REFERENCE CHARACTERS

1 . . . user, 11 . . . image acquiring portion, 12 . . . position acquiring portion, 13 . . . image-capturing propriety information acquiring portion, 14 . . . image editing portion, 15 . . . image output portion, 21 . . . position-information calculating portion, 22 . . . image-capturing propriety setting portion, 23 . . . image-capturing propriety information generating portion, 24 . . . image-capturing propriety information transmitting portion, 100 . . . image capturing apparatus, 101 . . . main control portion, 103 . . . RAM, 110 . . . storage, 120 . . . operation input portion, 121 . . . operation key, 122 . . . touch sensor, 123 . . . touch panel, 130 . . . image processing portion, 131 . . . display portion, 132 . . . image-signal processing portion, 133 . . . first image input portion, 134 . . . second image input portion, 140 . . . audio processing portion, 141 . . . audio output portion, 142 . . . audio-signal processing portion, 143 . . . audio input portion, 150 . . . sensor portion, 151 . . . GPS receiver, 152 . . . gyroscopic sensor, 153 . . . geomagnetic sensor, 154 . . . acceleration sensor, 160 . . . communication processing portion, 161 . . . LAN communication portion, 162 . . . telephone network communication portion, 163 . . . BT communication portion, 170 . . . enhanced I/F portion, 201 . . . main control portion, 203 . . . RAM, 210 . . . storage, 220 . . . operation input portion, 221 . . . operation key, 222 . . . touch sensor, 223 . . . touch panel, 230 . . . image processing portion, 231 . . . display portion, 232 . . . image-signal processing portion, 233 . . . first image input portion, 234 . . . second image input portion, 240 . . . audio processing portion, 241 . . . audio output portion, 242 . . . audio-signal processing portion, 243 . . . audio input portion, 250 . . . sensor portion, 251 . . . GPS receiver, 252 . . . gyroscopic sensor, 253 . . . geomagnetic sensor, 254 . . . acceleration sensor, 260 . . . communication processing portion, 261 . . . LAN communication portion, 262 . . . telephone network communication portion, 263 . . . BT communication portion, 270 . . . enhanced I/F portion, 300 . . . network, 400 . . . GPS satellite, 500 . . . server apparatus

The invention claimed is:

1. An image processing apparatus comprising:
a camera;
a storage;
a controller; and
a display;
wherein the camera is configured to capture an image,
wherein the storage is configured to:
store a capturing position information and a capturing direction information in accordance with the image; and
store a capturing propriety information which including an external apparatus position information and a setting information relating to capture propriety,
wherein the controller, in case that the setting information indicates denial for capturing, is configured to: perform a masking process for the image to a region corresponding to an external apparatus position in accordance with the external apparatus position information relating to the capturing position information and the capturing direction information when the external apparatus position is included in a range of angle of view and the camera captured the image; and
generate a masking process information that makes unnecessary the masking process by changing the capturing direction information, when the external apparatus position is included in the range of angle of view and the camera captured the image, and
wherein the display is configured to display the image and the masking process information.

2. The image processing apparatus according to claim 1, wherein the controller is configured to perform the masking process for the image to a part of a person in the region.

3. The image processing apparatus according to claim 2, wherein the controller is configured to perform the masking process for the image to the part of the person for face.

4. A method for displaying an image comprising the steps of:
capturing the image;
storing a capturing position information and a capturing direction information in accordance with the image;
storing a capturing propriety information which includes an external apparatus position information and a setting information relating to capture propriety;
in case that the setting information indicates denial for capturing: performing a masking process for the image to a region corresponding to an external apparatus position in accordance with the external apparatus position information relating to the capturing position information and the capturing direction information when the external apparatus position is included in a range of angle of view and the camera captured the image;
generating a masking process information that makes unnecessary the masking process by changing the capturing direction information, when the external apparatus position is included in the range of angle of view and the camera captured the image; and
displaying the image and the masking process information.

5. The method according to claim 4, further comprising the step of:
performing the masking process for the image to a part of a person in the region.

6. The method according to claim 5, further comprising the step of:
   performing the masking process for the image to the part of the person for face.

* * * * *